(12) United States Patent
Schaap

(10) Patent No.: US 6,461,695 B1
(45) Date of Patent: Oct. 8, 2002

(54) BELLOWS-SHAPED ARTICLE

(76) Inventor: Elyakim Schaap, 27 Mishol Hahadass, Jerusalem 97277 (IL)

( * ) Notice: Subject to any disclaimer, the term of this patent is extended or adjusted under 35 U.S.C. 154(b) by 0 days.

(21) Appl. No.: 09/713,793

(22) Filed: Nov. 14, 2000

(51) Int. Cl.[7] .............................................. B29D 22/00
(52) U.S. Cl. .......................... 428/34.1; 156/192; 165/2; 256/257; 256/258; 256/314
(58) Field of Search ................................. 256/258, 257, 256/314; 156/192; 165/2

(56) References Cited

U.S. PATENT DOCUMENTS 3,407,102 A * 10/1968 Wilkinson .................. 156/192
3,939,904 A * 2/1976 Beaufrere ...................... 165/9
4,961,989 A * 10/1990 Grimwood .................. 442/60

FOREIGN PATENT DOCUMENTS

JP            60094119      * 10/1983

* cited by examiner

Primary Examiner—Mark L. Bell
Assistant Examiner—Shalie Manlove
(74) Attorney, Agent, or Firm—Townsend and Townsend and Crew LLP

(57) ABSTRACT

The invention provides a bellows-shaped article made of fiber reinforced plastics.

9 Claims, 3 Drawing Sheets

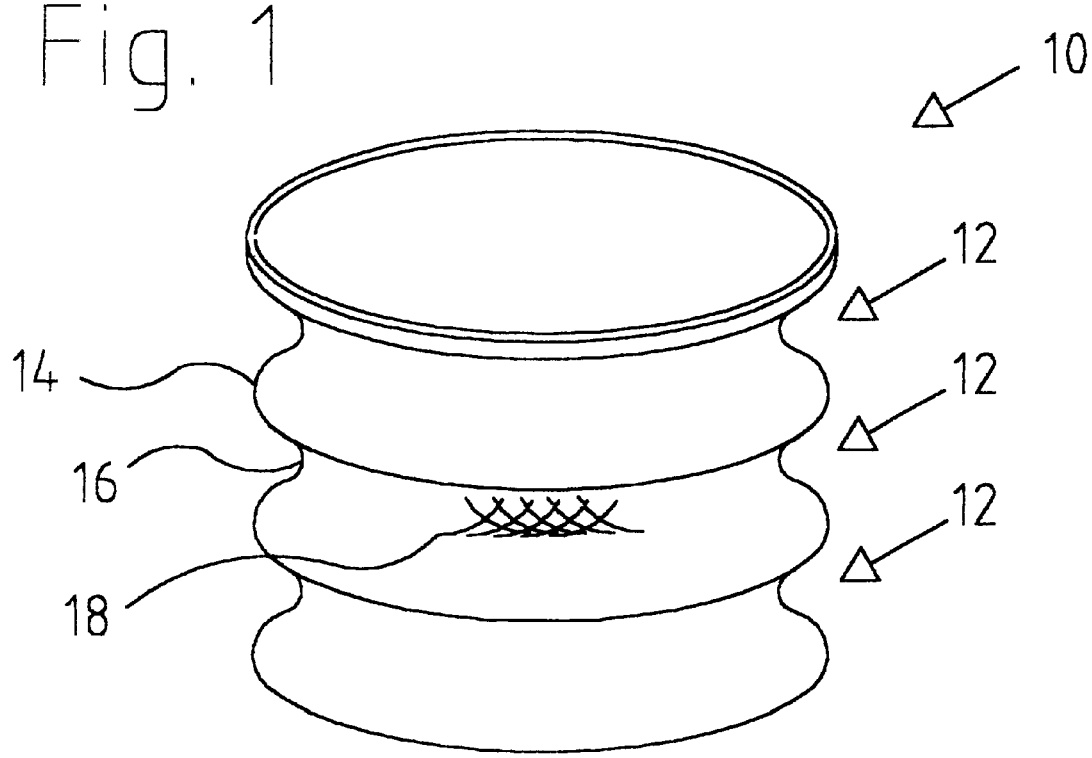

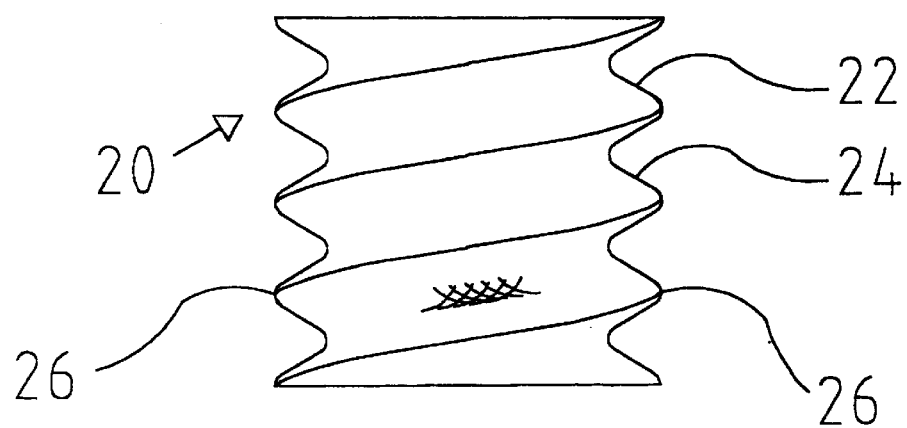

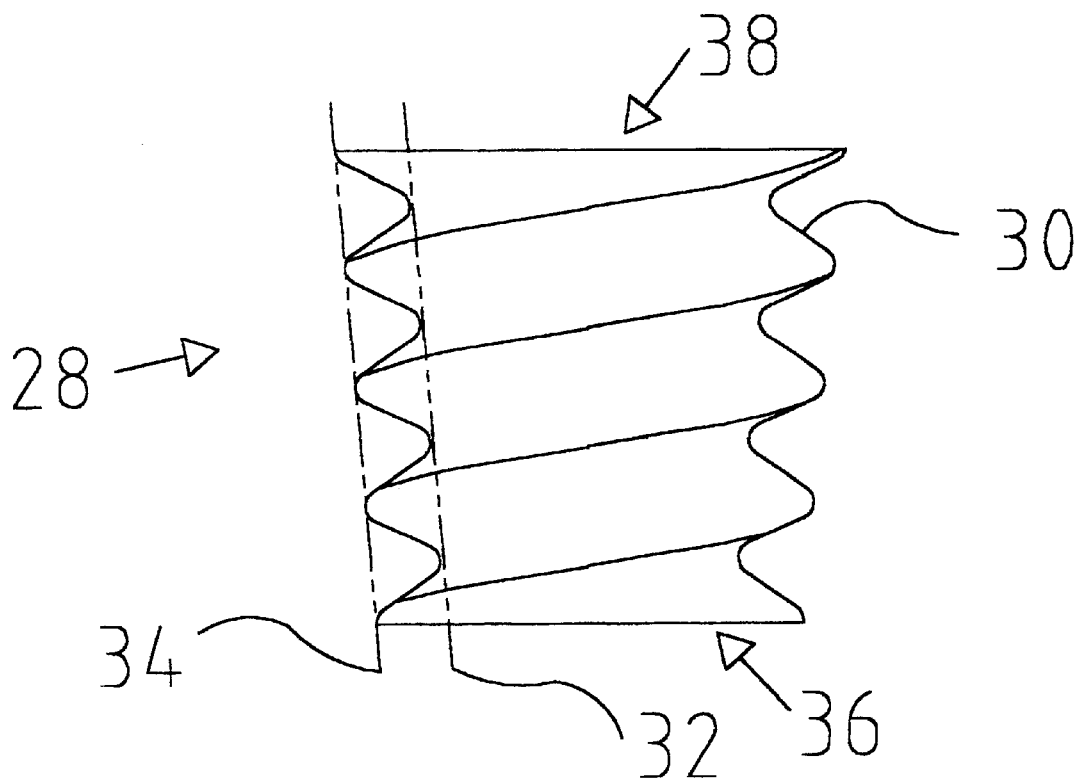

BELLOWS-SHAPED ARTICLE

The present invention relates to articles made in the form of bellows.

More particularly, the invention provides such an article using a fiber reinforced plastic. The invention is not concerned with light duty applications such as are found for example in noise-making toys.

A bellows article, usually of round cross-section, is a hollow cylinder or cone having corrugated walls which allow the length of the article to be changed in response to the application of a moderate axial force. Bellows articles have a small wall thickness to diameter ratio to allow wall bending without causing high material strain.

Known materials used for the construction of bellows are leather, plastics, particularly neoprene-coated nylon fabric, elastomers and metals. Each material has an appropriate field of application and each has its limitations. Leather cracks at low temperatures. Plastics which are flexible enough for use in bellows often have low strength. Elastomers are a very varied group of materials which each have their own characteristics and limitations. Fatigue resistant steel is expensive.

It is one of the objects of the present invention to obviate the disadvantages of prior art bellows-like articles and to provide such an article having improved strength to weight ratio and fatigue life, thus permitting use of bellows for existing and novel products.

The present invention achieves the above object by providing a bellows-shaped article made of fiber reinforced plastics, commonly designated composite materials or composites in short.

In a preferred embodiment of the present invention there is provided a bellows-shaped article having continuous corrugations arranged along helical lines.

In a specially preferred embodiment, helical lines of the corrugations are selected from the group consisting of a single helical line, double helical lines and triple helical lines.

In a most preferred embodiment of the present invention there is provided a bellows-shaped article wherein the reinforcing fibers consist of S-glass fibers, E-glass fibers, carbon fibers, graphite fibers, aramid fibers, or mixtures thereof and the plastic is an epoxide resin, a phenolic resin, a polyester resin or a mixture thereof.

As is known, bellows can have discrete parallel corrugations, these being parallel to the transversal plane, i.e. to a plane perpendicular to the axis.

In the prior art there are known light duty bellows wherein the corrugations follow a helical line.

A first example of such a helical bellows is found in hoses of vacuum cleaners made of homogeneous thermoplastic material, wherein the special helical bellows properties are used to make the hoses flexible in bending. They are considered here as light duty, due to the insignificant pressure differential, when in use, between inside and outside the hose.

Another example of helical bellows is an evacuation air duct of a laundry dryer. These have a composite structure of a helical steel wire, maintaining the ducts' circular cross section, with a very thin sheet wall made of plastic or similar material, ensuring air tightness. Such air ducts, beyond their flexibility in bending, are collapsible in the axial direction so that their transportation and storage demand relatively small volume.

Both of said applications are considered as light duty bellows and said bellows do not possess a wall strength suitable for medium or heavy duty use.

Medium duty bellows are, for example, metallic exhaust gas ducts of gas boilers, where the walls have to withstand relatively high temperatures, beyond the endurance of plastic materials.

Heavy duty, prior art, steel bellows are used to accommodate length differential due to heating of two proximate components, which have significantly different thermal expansion coefficients.

The novel material composition of the present invention is intended to provide the invented articles with medium and heavy duty properties.

High strength is derived from the fibers while the resin provides stability of form.

The present invention is intended to provide new applications for bellows-like articles. Such applications have not hitherto employed bellows-like components, either due to inadequate physical properties of the materials, or due to prohibitive cost.

An example of such novel application is the use of bellows-like articles as a heavy duty elastic spring.

Another example is employing a bellows-like article as a component of a heavy duty pump.

In one embodiment of the present invention the crest line of a corrugation of the bellows is parallel to a transversal plane (in case of composite bellows only, see FIG. 1.)

In another embodiment the crest line is disposed along an endless helical line (irrespective of material) so that the bellows obtains a shape of a twist drill, in the case of a double helix, or, the shape of a screw thread, in the case of a single helix. See FIG. 2 for a double helix.

Throughout this specification the terms "Groove" will indicate the concavity between two adjacent crests of corrugations as seen from the outside. The term "Groove Line" will indicate the deepest line of the groove. For helical bellows, the term "Helix Line" will be taken as including any line on the helical surface that is parallel to the crest line (including the crest line itself and including the groove line).

In discrete parallel corrugations and in helical corrugations, a crest line is longer than any other line parallel to it. A groove line is the shortest of all lines parallel to a crest line and any line parallel to the crest and groove lines located between the two is of intermediate length.

Any line of intersection between the surface of a helix shaped body and a transversal plane, as defined above, is a closed line, where all such lines, irrespective of the particular transversal plane in which they are contained are identical in shape and in length. The only difference is that the said closed lines are rotated relative to one another about the axis of the cylinder enveloping the bellows.

Throughout this specification the term "Transversal Surface Line" will be taken as including any line on the helical surface that is formed by the intersection of that helical surface and a transversal plane.

It is obvious that all lines formed by an intersection of a longitudinal plane through the axis of a helix shaped body and the surface of that same body are identical in developed length, provided that the body is at least as long as one pitch of the helix. This is correct irrespective of the helix being a simple helix, a double helix, or a triple helix. It is also correct for discrete parallel corrugations.

Throughout this specification the term "Longitudinal Surface Line" will be taken as including any line on the bellows surface that is formed by the intersection of that surface and such a longitudinal plane.

As for bellows with discrete parallel corrugations, also for a helical body (the length of which is sufficiently large relative to the pitch of the helix) it is always possible to find a family of mutually parallel spatial lines on its surface, disposed at a non-zero angle to a longitudinal surface line where all the lines of that family are identical in length.

Throughout this specification the term "Surface Line" will be taken as including any line on the bellows surface pertaining to such a family of lines. Obviously, the helix lines as defined above, (and for parallel corrugations, any intersections of the surface with transversal planes) do not make a part of a surface line family, as defined above, since they vary in length between a minimum for the groove line and a maximum for the crest line.

On the other hand, for helical bellows, a transversal surface line is a particular case of a surface line family, disposed at right angles to the longitudinal surface lines. As already mentioned, a transversal surface line, unlike other surface lines, is a closed line.

In a composite material bellows according to the present invention, assume two families of surface lines as defined above are formed by two layers (or plies) of unidirectional fibers (unidirectional as opposed to randomly disposed fibers). The surface lines of each of the two families are of identical length, but the length of lines, that is the length of the fibers of one of the families is not necessarily equal the length of fibers of the other family.

A particular case of a helical bellows is where one of the families is formed by transversal surface lines and the other family is formed by longitudinal surface lines. Each family is composed of a ply of unidirectional material.

Alternatively, one of the embodiments of the present invention refers to composite material bellows including a single ply of woven fabric. The warp and the woof of the fabric as described are at an angle (different of zero or 90 degrees) to the crest lines.

Obviously all fibers of the warp or of the woof of said fabric, being parallel to one another and reaching from one edge of the fabric to the opposite edge, when wrapped around to form a cylinder, are of identical length.

Helix lines, as defined above, are not identical in length. Secondly, they are not perpendicular to the fabric fibers if disposed as described above. This implies, for composite material bellows according to the present invention, that the warp and woof of the fabric will not at all points of the surface be at right angles to one another.

To clarify the concept, consider a particular case of fabric composite material bellows. In this particular case let a helix line intermediate between the crest and groove lines meet the warp and woof at plus and minus 45 degrees. Consequently at that particular point the warp and woof are mutually perpendicular. The warp and woof form, therefore, small squares and one of the diagonals of any such square lines on the said particular helix line.

Moving conceptually from this helix line to an adjacent helix line, the squares become lozenges or diamond shaped. As one approaches the crest line the lozenge diagonals lying on the helix lines become longer and longer and as one approaches the groove line the lozenge diagonals lying on the helix lines become shorter and shorter. Meanwhile, the sides of the lozenges remain equal to those of said squares. This results from the crest line being the longest of all helix lines and the trough line being the shortest of all helix lines, as the fibers of the fabric cannot be stretched or crimped.

In the course of manufacturing composite bellows, according the present invention, as long as the lay-up is not cured, it is possible to force the fabric to follow the surface of the helix. Such forcing involves shear forces in the plane of the fabric. The length of the warp and woof is not affected by the shear force. Only the matrix is affected, and before curing the matrix does not offer high resistance to the shear force.

After curing, the matrix becomes stiff and the shape of the composite bellows becomes stable. Additional deformation can result only from subjecting the bellows to axial or fluid pressure loads.

In the particular case (of helical bellows) where the warp and woof are initially disposed on transversal and longitudinal surface lines, forcing the fabric to the helical shape makes the warp and the woof oscillate about the initial transversal and longitudinal surface lines.

The statements in the former paragraphs are correct irrespective of the technology used to manufacture the bellows, whether by wet lay-up technology or by pre-impregnated fiber ("prepreg") technology.

However it is not possible to dispose the warp or the woof along helix lines, or at very small angles thereto, since forcing the fabric to conform to the lengths of the helical surface would involve stretching and crimping the yarns, which is not possible before the resin is cured.

Consider composite bellows with discrete parallel corrugations, wherein at a certain point approximately half way between a crest line and the adjacent groove line, two families of surface lines are formed by two plies of unidirectional fibers mutually perpendicular at that point and at plus and minus 45 degrees to transversal (or a longitudinal) surface line. Reasoning as above indicates the possibility of using fabric also for such bellows.

The general case of composite bellows according to the present invention is where the fibers, whether unidirectional or making part of fabric, are disposed at an arbitrary, but not too small, angle to the helix lines (or the crest line).

The selected angles are intended to facilitate manufacturing, or to determine the mode of deflection of the bellows under load, or for any other purpose.

Compressing or stretching of bellows requires that the thickness of the skin be very small relative to the other dimensions of the bellows. Thus surface lines on the outer surface are, for all practical purposes, identical in length to those surface lines on the inner surface which are parallel to the first.

Besides material composition and the number of fiber directions, as will be mentioned below, the particular mechanical properties of the bellows depend on the diameter, the depth and form of the corrugations and the thickness of the material.

In some applications of composite bellows according to the present invention, the bellows are subjected to internal or external pressure and are designed to withstand such pressure. For this purpose at least two distinct directions of fibers are required and it is also required that the edges of the wrapped around fiber plies overlap so as to transmit by shear stresses the tensile or compressive loads which exist along the fibers where they do not overlap.

Also preferred is an arrangement wherein a plurality of first ends of fibers of overlap a plurality of second ends of said same fibers.

For any given pressure, skin tensile stress is proportional to the diameter of the bellows and inversely proportional to the thickness of the material. At large diameters a corresponding larger thickness is needed to prevent actual stress exceeding allowed material stress. This is achieved by constructing the bellows of multiple plies of fabric or unidirectional fibers, or a composition thereof.

Generally, composite bellows made according to the present invention are intended to be subjected to axial tensile or compressive loads and to react to these loads by flexure of the corrugations. Such bellows are not intended to be subjected to twisting moments and consequently it is not necessary or desirable to stiffen the bellows against shear loads in the plane of the fabric, or, in practice, to add a third or fourth direction of fibers. This means that even in the case of multiple plies there will generally be only two distinct fiber directions.

However there are particular applications of bellows made according to the present invention where the bellows are intended to resist twisting, in which case a third direction of fibers is essential.

For example, the fibers can meet a certain helix line at minus 45, plus 45 and 90 degrees.

In this case also it is essential that the ends of the wrapped-around fibers overlap so as to transmit by inter-laminar shear forces the normal loads which exist along the fibers where they do not overlap.

Where the bellows are used as simple elastic springs, an overlap is not essential and any number of fiber directions is acceptable, two directions being a minimum.

In the general case composite material bellows made according to the present invention will have a double helix shape. This shape bestows axial symmetry upon the bellows, i.e., each point of the bellows has another point diametrically disposed thereto that is identical to the first in any respect of form and mechanical properties. In the tangential direction, axial symmetry means clockwise in both points or else anti-clockwise in both points.

This means also that by subjecting the bellows to axial loads no preferred direction of deformation exists besides the axial direction. Under axial load the bellows axis remains straight. Bellow twisting is nevertheless possible.

However, if advantageous for mechanical properties, manufacturing or cost considerations, the helical shape can be single. A single helix is not axially symmetrical, and thus does not have the advantages of such symmetry.

It is a common practice to limit the design of composite laminates to balanced (orthotropic) and symmetric construction. The symmetry is about mid-thickness. If not balanced, the composite material twists during curing. In the case of the axial symmetry of the structure, as in the present invention, any such twist can only be about the cylinder axis and does not constitute a drawback. This obviates the necessity to balance the lay-up.

The envelope of the above described shapes and compositions of bellows is essentially cylindrical. However, in the case of helical bellows a slightly tapered envelope offers the advantage of easy release of the product from its manufacturing tool by screwing one off the other. Another advantage is the easy possibility of blocking the ends of the bellows by suitable plugs, helical and slightly tapered as well, so as to form closed volumes.

Further embodiments of the invention will be described hereinafter.

It will thus be realized that the bellows-like article of the present invention makes possible the use of thin walls, which reduces strain during bending, yet wall strength is high due to the fiber reinforcement, thus making possible new applications such as extending the allowed internal pressure of such an article.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a perspective view of an embodiment of the bellows-like article according to the invention having discrete parallel corrugations.

FIG. 2 is a perspective view of a helical corrugation embodiment; and

FIG. 3 is a perspective view of a conical embodiment.

There is seen in FIG. 1 a bellows-shaped article 10 made of a fiber reinforced plastic.

The embodiment shown has a plurality of discrete corrugations 12 which are mutually parallel. The envelopes of both the outside, the crest 14, and the inside, the groove root 16 of the corrugations are those of imaginary right cylindrical surfaces. Preferably the fibers 18 are S-glass fibers, E-glass fibers, carbon fibers, graphite fibers, aramid fibers or mixtures thereof, depending on strength/cost/application considerations.

Fibers for the bellow-type article of the present invention are usually arranged in two directions. This can be done either by use of a woven fabric or a plurality of unidirectional plies. The angle between the warp and woof of the finished article is not 90 degrees at all points.

Preferred suitable plastics are an epoxide resin, a phenolic resin, or a polyester resin, as these materials have well-established use as matrices for composite materials.

Suitable manufacturing methods utilize pre-impregnated fibers or fabrics or can utilize wet lay-up technology.

Referring now to FIG. 2, there is seen a bellows-shaped article 20 having continuous corrugations 22, 24 arranged along helical lines. In the embodiment shown, there are two helical crests 26 spaced at 180 degrees, the form being similar in principle to that of a twist drill. The fibers are shown only in the grooves.

In another embodiment, not shown, a single helical crest line is used, to form a shallower angle as in a screw thread.

In a further embodiment a steep angle is obtained by the use of triple helical lines.

FIG. 3 illustrates a bellows-shaped article 28 having corrugations 30 wherein the envelope of the groove line 32 of the corrugations and the envelope of the outside 34 of the corrugations both form imaginary right conical surfaces. Such form can facilitate manufacturing of the article.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A corrugated bellows-shaped article constructed in its entirety of fiber reinforced plastic composite material wherein said fibers are arranged in at least two distinct directions within the material and the fibers cross each other and cross the crest lines and groove lines of said corrugations, the fibers being arranged as a woven fabric or being arranged as at least two layers of unidirectional fibers having at least two distinct directions, and wherein said fibers are selected from the group consisting of S-glass fibers, E-glass fibers, carbon fibers, graphite fibers, aramid fibers and mixtures thereof and said plastic is selected from the group consisting of an epoxide resin, a phenolic resin and polyester resin.

2. A bellows-shaped article according to claim 1, having discrete corrugations which are mutually parallel.

3. A bellows-shaped article according to claim 1, having continuous corrugations arranged along helical lines.

4. A bellows-shaped article according to claim 3, wherein said helical lines are selected from the group consisting of a single helical line, double helical lines and triple helical lines.

5. A bellows-shaped article according to claim 1, having corrugations wherein the envelope of the inside of said corrugations and the envelope of the outside of said corrugations are each selected from the group consisting of a right cylindrical surface and a right conical surface.

6. A bellows-shaped article according to claim 1, manufactured of pre-impregnated fibers.

7. A bellows-shaped article according to claim 1, wherein said fibers are selected from the group consisting of woven fabric, unidirectional fibers and a combination thereof.

8. A bellows-shaped article according to claim 1, wherein a plurality of first ends of fibers overlap a plurality of second ends of said same fibers.

9. A bellows-shaped article according to claim 1, comprising three distinct directions of fibers adapted to resist twisting applied thereto.

* * * * *